Nov. 21, 1967  P. W. DULHUNTY  3,353,274
AERIAL NAVIGATION DEVICE
Filed May 12, 1965
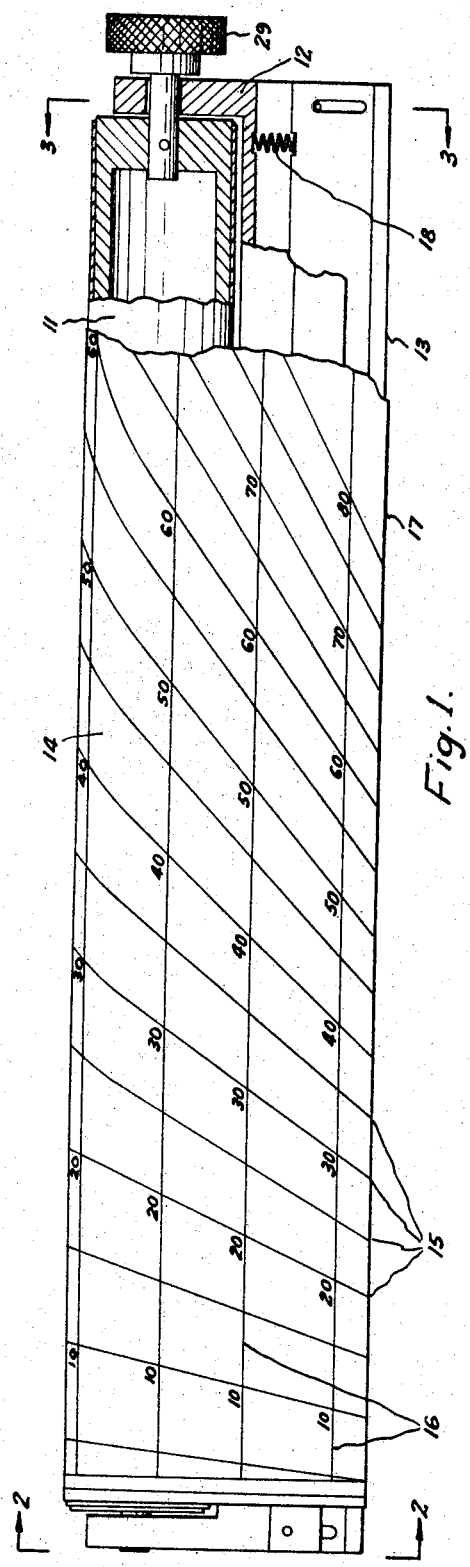
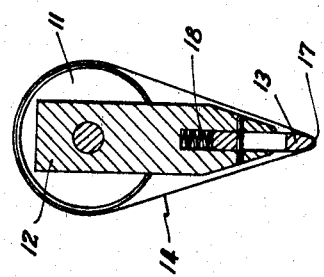
Fig.3.
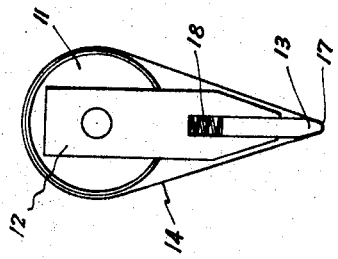
Fig.2.
Fig.1.
INVENTOR:
PHILIP W. DULHUNTY
ATTORNEYS

United States Patent Office 3,353,274
Patented Nov. 21, 1967

3,353,274
AERIAL NAVIGATION DEVICE
Philip Wellesley Dulhunty, 16 Chisholm Road,
Sefton, New South Wales, Australia
Filed May 12, 1965, Ser. No. 455,237
Claims priority, application Australia, May 15, 1964,
44,573/64
3 Claims. (Cl. 33—107)

ABSTRACT OF THE DISCLOSURE

A navigation device for determining the ground speed of an aircraft or for establishing an estimated travel time to a destination includes an endless flexible chart which encircles and rides on both a roller and a relatively sharp straight edge member. The chart is graduated so that its abscissae are parallel to the straight edge member and represent map distances, and its ordinates which are normal to the straight edge member correspond to aircraft ground speeds. A spring biases the roller and the straight edge member apart to maintain the chart in taut condition.

---

This invention relates to aerial navigation systems.

In such systems, a critical parameter, so far as an aerial navigator is concerned, is the time at which his craft is likely to arrive at some known location. It is of little consequence for him to be informed of the distances which he has travelled, or will travel, or for him to know his air or ground speeds, excepting for the purpose of computations which will result in his knowledge of the times at which certain positions will be taken up.

A common and simple method of aerial navigation is that known as "dead reckoning." In this system a navigator's first problem is to find the true ground speed of his aircraft. One method of determining the ground speed is for the navigator to identify two known landmarks by observing the terrain across which he is travelling. By noting the time taken by the aircraft to pass from one of said landmarks to the other, he may then calculate the distance between said marks by measuring the distance between their representations upon a map, and then converting the measured distance by reference to the known scale of the map, and thus calculate the average speed at which the aircraft has travelled between them. It is thus possible for the navigator to calculate the time at which the aircraft is due to arrive at another point represented upon said chart by computing from the known data, that is to say, the calculated ground speed and the distance to that point, which is measurable directly on the map, after reference once again to its scale.

However, it has been found difficult, especially in light aircraft of the kind in which a pilot must of necessity carry out his own navigation, for him to conduct accurate measurements and also carry out calculations while attending to his other duties.

It is an object of the present invention to provide a simple navigation system which will permit a navigator to predict the time at which his aircraft will arrive at a particular place shown on a map, without the necessity for calculation of both ground speed and distance before doing so.

In accordance with the invention in one of its aspects, therefore, a navigation system comprises a measuring instrument adapted to be applied to a map so as to measure directly between pairs of points on said map, the ground speed of an aircraft between observed landmarks represented by said points, and between which said aircraft has flown, said instrument being further adapted to be applied subsequently to said map to read directly therefrom the time at which said aircraft will arrive at a place represented by any other point on said map by continuing to travel at said ground speed.

Certain particular embodiments of this invention will now be described with reference to the accompanying drawings, in which similar references indicate corresponding parts, and in which:

FIG. 1 shows in plan view, and partly in section, a navigation instrument constructed in accordance with the invention, FIG. 2 shows in end elevations, a view along the line 2—2 of FIG. 1, FIG. 3 shows in end elevation, and partly in section a view along the line 3—3 of FIG. 1.

Upon referring to FIGS. 1, 2 and 3 it will be seen that a navigation or measuring instrument comprises a roller 11 located in a frame 12 which tapers to a relatively sharp edge 13. About said roller and said edge is wrapped on initially cylindrical chart 14 formed from paper or other flexible material in such a manner that the sharp edge, which is preferably spring-loaded away from the roller, stretches said chart tightly about the roller and the edge. The chart is thus creased temporarily about said edge and is capable of being traversed across it by rotating the roller. The chart, prior to its installation upon the instrument, comprises a family of graphs such as 15 drawn upon axes whose abscissae are parallel to the edge 13 and represent distances in say, miles or nautical miles, and whose ordinates are perpendicular to the edge 13 and represent speed in say, miles per hour or nautical miles per hour. A family of curves drawn on these axes is thus of such a nature that the curves intersect a plurality of points along the sharp edge 13. The edge 13 presents a series of cut-off intervals, along its length, corresponding to the times taken for an aircraft, travelling at a speed which may be indicated on the X-axis, to travel between the points of intersection of the various curves and the sharp edge. By virtue of the arrangement of the drum and edge above described, each one of a series of lines, such as 16 parallel to the Y-axis, and each corresponding to a particular value of aircraft speed, may be brought into coincidence with said edge by turning the roller 11, whose motion may of course also bring into juxtaposition with said edge any intermediate real or imaginary line parallel to said Y-axis, and representing interpolated values of speed.

In use, the instrument is applied to a map of the region across which the aircraft is flying, after the pilot has first observed the time taken to travel between two identified landmarks upon the terrain. After having noted the map positions of the representations of said landmarks, the roller 11 of the instrument is rotated until the observed time taken to travel from one landmark to the other corresponds to some interval between adjacent curves such as 15 along the creased edge of the chart, and so that this interval corresponds to the spacing between the representations which have just been located on said map. That is to say, the distance which is read along the creased edge 17 of the chart 14 as the distance between two adjacent curves of the family, must agree with the spacing on the map between the representations of the known landmarks. When this has been done, it is then necessary only to read directly from the creased edge 17 to determine the value of ground speed indicated on the Y-axis or ordinate. Numerals indicating ground speeds of 80, 90 and 100 miles per hour may be shown on the left edge of the chart in FIG. 1. However, it is not necessary to make any use of this knowledge of the ground speed, because the creased edge is in such a position that it is now only necessary to apply said edge to the map and read directly from said edge the time taken (at the computed ground speed) to travel between any two discernible points on a path on said map corresponding to a path along which the aircraft is known to be flying.

The ground speed may, if desired, be "locked" on the drum by means of a thumb-screw or the like (not shown). When determining the ground speed it is, of course, an advantage to select landmarks which are relatively close together, so that the average speed of the aircraft when flying between them is approximately a measure of any particular speed which the aircraft may assume at any point along its path between said landmarks. On the other hand, it is desirable that the landmarks should be sufficiently widely spaced to enable an accurate observation of the average speed to be made.

For use in a particular aircraft, a chart is provided with a family of curves corresponding to the likely speeds of such aircraft in flight. Thus a series of charts may be provided, each covering the still-air speed of a popular aircraft, plus and minus approximately 25 miles per hour. The speed of 60 miles per hour, which is likely to be the minimum speed used, may, of course, be read directly as a distance scale if desired, since this speed corresponds to one mile per minute. If different aircraft are to be covered by the system, alternative charts may be provided with each instrument, and the installation of such charts is facilitated by the spring 18 which urges the sharp edge 13 away from the roller 11. Thus, it is only necessary to compress the instrument by squeezing the edge towards the roller and the charts may be readily interchanged to provide different speed ranges.

Since the charts are given an initially cylindrical format, additional strength may be imparted to them by winding them in convolutions from a single strip and providing a spirally shaped joint along the sides of said strip.

I claim:

1. A navigation device for measuring between a pair of points on a map to determine the ground speed of an aircraft or to indicate directly the time required to travel to a point on a map, said device comprising; a frame having a relatively sharp straight edge portion, a roller supported in said frame and rotatable about an axis parallel to said straight edge portion, an endless flexible chart mounted on said roller and having its inner surface lying on said straight edge portion, and spring means biasing said roller and said straight edge portion apart to maintain said chart tightly against said roller and said straight edge portion while permitting said chart to move with respect to said straight edge portion.

2. A navigation device according to claim 1 wherein said endless flexible chart bears upon its outer surface a family of graphs drawn upon axes whose abcissae are parallel to said straight edge portion and represent map distances and whose ordinates correspond to aircraft speeds.

3. A navigation device according to claim 1 wherein said endless flexible chart is a single strip of flexible material wound in convolutions interconnected at their edges by a spirally-shaped joint.

References Cited

UNITED STATES PATENTS

| 2,156,524 | 5/1939 | Christensen | 33—107 |
| 2,353,799 | 7/1944 | Ward | 33—107 |

FOREIGN PATENTS

| 1,286,046 | 1/1962 | France. |
| 890,131 | 9/1953 | Germany. |
| 5,158 | 4/1915 | Great Britain. |
| 132,760 | 9/1919 | Great Britain. |

ROBERT B. HULL, *Primary Examiner.*